UNITED STATES PATENT OFFICE 2,646,420

SYNTHETIC LINEAR CONDENSATION POLYMERS CONTAINING PHOSPHORUS

Paul W. Morgan, Kenmore, N. Y., assignor to E. I. du Pont de Nemours and Company, Wilmington, Del., a corporation of Delaware No Drawing. Application July 22, 1949, Serial No. 106,331

12 Claims. (Cl. 260—75)

This invention relates to polymeric materials and more particularly to new fiber- and film-forming synthetic linear condensation polymers having new and unusual properties.

It is known to react difunctional reactants under conditions such that linear condensation superpolymers are formed which can be spun into useful filaments capable of being cold drawn. Carothers U. S. Patents 2,071,250, 2,071,253, 2,130,523, and 2,130,948 in particular, disclose the preparation of such linear condensation superpolymers. The polyesters and polyamides described in the aforementioned patents, having an intrinsic viscosity greater than 0.3, are primarily useful as fiber forming materials, and because of their stability, high melting points, relative insolubility, etc., they are very useful in the textile and allied arts. The lower molecular weight linear condensation polymers are used with great advantages in coating compositions, and as softeners, moulding powders, etc.

An object of this invention is to provide novel superpolymers of the class of linear condensation polymers.

Another object is to provide novel linear condensation superpolymers capable of being converted into cold-drawable filaments having unusual and advantageous characteristics.

Still another object is to provide oriented filaments of novel linear condensation superpolymers, which filaments have good stability, strength, dyeing characteristics, elastic recovery, and an exceptionally high work recovery.

A further object is to provide new and highly useful fiber- and film-forming polyamides and polyesters. The foregoing and other objects will more clearly appear hereinafter.

These objects are accomplished by heating to reaction temperature substantially equal molecular proportions of difunctional reactants capable of yielding linear condensation polymers e. g., a diprimary, disecondary or primary-secondary diamine or glycol and a dicarboxylic acid or derivative thereof, at least one of said reactants containing phosphorus which is present as a part of the divalent radical:

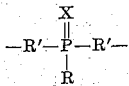

wherein R is any monovalent hydrocarbon radical, R' is a divalent hydrocarbon radical from the group consisting of aromatic and cycloaliphatic hydrocarbons and X is a member of the group consisting of oxygen and sulfur and continuing the reaction until a polymeric product of the desired intrinsic viscosity is obtained.

The general process for the formation of representative examples of the various acids, esters, and amines involved in the preparation of this new series of phosphorus-containing polymers is illustrated in the following reactions:

(I) 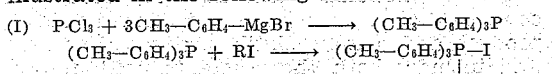
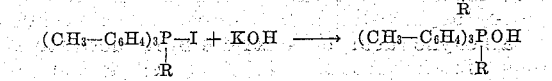
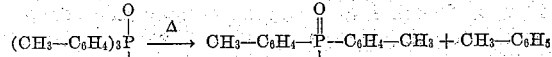
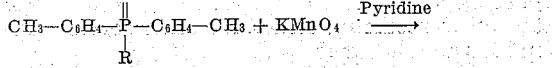
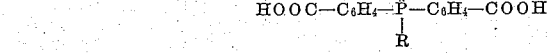
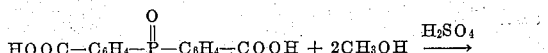

(II) 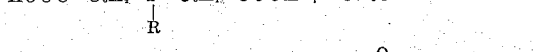
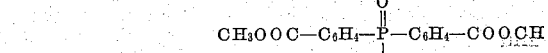

which is converted to the acid and ester as in (I)

(III) For aminophenyl derivatives

is used in place of $CH_3-C_6H_4-MgBr$, above, to give

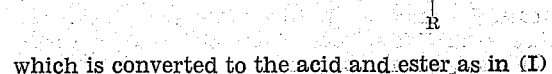

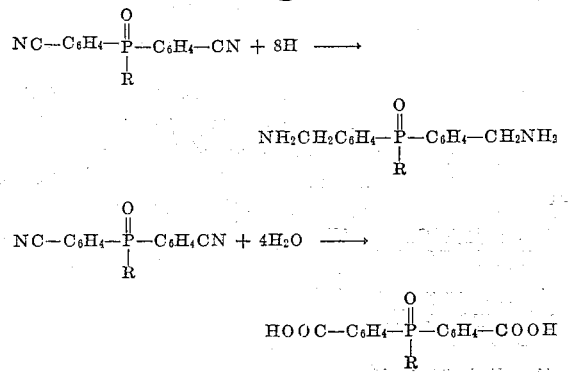

(IV) For hydroxyphenyl derivatives

RO—C₆H₄—MgBr is used in place of CH₃—C₆H₄—MgBr to give

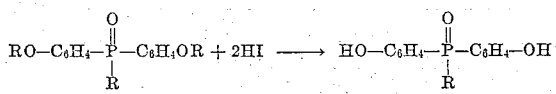

The phosphine sulfide intermediates are prepared in analogous fashion.

By "difunctional reactants" is meant, of course, reactants capable of yielding a volatile product and a non-volatile product (polymer) and includes both the reactants used in preparing a polyester, i. e., a dihydric alcohol and dicarboxylic acid or ester-forming derivatives of a dibasic carboxylic acid, as well as the reactants used in the preparation of polyamides, i. e., a diamine and a dicarboxylic acid or an amide-forming derivative of a dibasic carboxylic acid.

The polymers of this invention thus contain phosphorus atoms as a part of the polymer chain and have recurring structural units corresponding to the following:

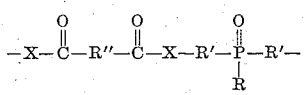

and

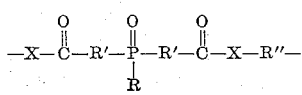

and

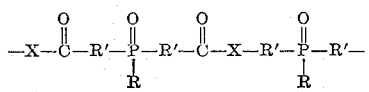

wherein R may be any monovalent hydrocarbon radical, R' is a divalent hydrocarbon radical selected from the group consisting of divalent aromatic and cycloaliphatic hydrocarbon radicals, R'' may be any divalent hydrocarbon radical, and X is selected from the group consisting of nitrogen and oxygen.

In common with other polyesters and polyamides, the polymers of this invention may be prepared by more than one route. In the case of polyesters, they may be prepared by:
1. Self-condensation of a hydroxy acid.
2. Esterification of a dibasic acid or ester-forming derivative thereof by a glycol.

Similarly, polyamides may be prepared by:
1. Self-condensation of an amino-acid.
2. Condensation of a dibasic acid or amide-forming derivative thereof with a diamine.

While for maximum phosphorous content of the final polymer it is preferred to use reactants in which both components contain the phosphorus unit (a self-condensing, phosphine sulfide or oxide-containing material, e. g., hydroxy acid or amino-acid, is comprehended, of course), it is obviously possible to reduce the phosphorous content by using one difunctional reactant containing no phosphorous, e. g., hexamethylenediamine or ethylene glycol.

From the above it is apparent that all of the difunctional reactants described by Carothers as being useful for the preparation of polyesters and polyamides may be used in connection with one or more of the phosphorus containing difunctional reactants described herein to form the new polymers of this invention.

In the preferred practice of the invention, the difunctional reactants are heated at polymer-forming temperatures generally in the range of 150-320° C. in the presence or absence of a diluent until the product has a sufficiently high molecular weight to exhibit fiber-forming properties. As in the case of the conventional polyesters and polyamides, the fiber-forming stage can be tested by touching the molten polymer with a rod and drawing the rod away. When this stage has been reached, a continuous filament of considerable strength and pliability is readily formed. This stage is generally reached when the polyamide or polyester has an intrinsic viscosity of above 0.3. Intrinsic viscosity is defined as:

$$\text{limit} \frac{\ln (\eta_r)}{C} \text{ as } C \text{ approaches } 0$$

wherein ($\eta_r$) is the viscosity of a dilute solution of the polymer in meta-cresol divided by the viscosity of meta-cresol in the same unit at the same temperature and C is the concentration in grams of the polymer for 100 cc. of solution. In the case of polyesters the same general conditions hold except that the preferred solvent is a 60 : 40 mixture of phenol and tetrachloroethane. In general, measurement of the intrinsic viscosity is the most convenient method for following the course of the reaction and determining whether or not a fiber-forming product has been obtained.

The reaction by which these fiber-forming polymers may be obtained is a linear condensation polymerization. It involves the formation of a by-product, such as water, alcohol, phenol, hydrogen chloride, ammonia, etc., depending upon the derivatives of the dibasic acid used in the reaction.

In general, in the case of the polyamides, they may be prepared most economically from a diamine and a dicarboxylic acid. The first reaction which occurs when the diamine and dicarboxylic acid are mixed and brought into sufficiently intimate contact is the formation of the diamine-dicarboxylic acid salts. The salt is generally crystalline and readily purified by recrystallization from a suitable solvent and is generally the starting material for the subsequent polymerization. With respect to polyesters, while they may be formed directly from the dihydric alcohol and the dicarboxylic acid, it is generally preferred to react the dimethyl ester of the desired acid with excess dihydric alcohol to form the bis-glycol ester of the acid involved with the elimination of methanol. This diester is in turn reacted under polymerization conditions with elimination of approximately half of the dihydric alcohol to form the new polyesters of this invention.

The conversion of the diamine-dibasic salt or again the bis-glycol ester to a synthetic linear polymer is carried out by heating at polymer-forming temperatures generally between 150–320° C. in the presence or absence of a diluent and under conditions which will permit the by-product of the reaction to escape, during the last stages of the reaction at least, until an examination of a test portion of the product indicates it has the desired fiber-forming properties. As examples of diluents which may be used in the reaction in the case of polyamides may be mentioned phenol, the cresols, xylenols, diphenylolpropanes and ortho-hydroxybiphenyl. As examples of diluents that may be used in the preparation of polyesters may be mentioned biphenyl, diphenylene oxide and tetrahydronaphthalene. White mineral oil is an example of a non-solvent which may be used. The first stage of the reaction can be carried out in the presence of the condensation by-product, e. g., an autoclave under pressure. Or again, if the melt polymerization process is not desired, a fiber-forming polymer may be prepared by the solid polymerization process described in U. S. 2,172,374—Flory.

The polymerization reaction may be carried out at atmopheric, super-atmospheric or sub-atmospheric pressure depending upon the best conditions suitable for the polymer and method of polymerization involved. The last stages of the reaction, at least, should be carried out under conditions which permit the escape of the by-product of the reaction. Unless this is water, a vacuum will generally be desirable. Preferably also, the reaction should be carried out in the absence of oxygen, e. g., an atmosphere of nitrogen or in a vacuum. While it is frequently unnecessary to add a catalyst, inorganic materials of alkaline reaction, such as oxides and carbonates, and acidic materials such as halogen salts of polyvalent elements, e. g., aluminum, tin are often helpful. Two examples of specific catalysts that may be mentioned are zinc borate and litharge.

The polymers of this invention having an intrinsic viscosity of at least 0.3 are characterized by their fiber-forming properties, i. e., their ability to be formed into filaments which can be cold drawn to fibers showing by characteristic X-ray diffraction patterns orientation along the fiber axis. One method (wet process) of spinning these polymers into filaments consists of dissolving them in a suitable solvent and extruding the solution through orifices into a liquid which dissolves the solvent but not the polymer, e. g., a hydrocarbon or in some instances water, and collecting the filaments thus formed on a suitable revolving drum. Another method (dry process) consists in extruding the solution of the polymer into a heated chamber where the solvent is removed by evaporation. Still another method (melt process) consists in extruding the molten polymer through orifices into the atmosphere where it congeals into a filament. In some cases, particularly when the filaments are large, e. g., of bristle size, it may be advantageous to spin the molten material into a cooling liquid, e. g., water. By similar processes the polymers can be formed into rods, sheets, foils, ribbons, films and the like. In the various methods of forming shaped articles from products of this invention, particularly when these articles are obtained from solutions, characteristics of the filaments, etc., can be altered by blending the polymers with other polyamides and polyesters and/or resins, plasticizers, cellulose derivatives, pigments, dyes, delustrants, etc.

After spinning, the filaments are normally cold drawn since this improves their strength and elasticity. The filaments from the products of this invention vary in the extent to which they can be cold drawn, but generally the degree of cold drawing possible will lie between 150–500%. Although ribbons, sheets and the like can also be cold drawn, it is generally more advantageous to cold roll these products. By cold rolling such products in mutually perpendicular directions, it is possible to obtain products of great strength in all the directions.

Although the properties of the fibers of this invention vary with the nature of the reactants used in the preparation, properties which characterize the fibers are high work recovery, good initial tensile modulus, orientation along the fiber axis, as well as high strength, good dyeing characteristics and flame-resistance.

Work recovery (WR) which is a criterion of resilience, is the ratio of the amount of work done by a yarn in recoverying from deformation to the work done in deforming it. To determine work recovery a stress-strain curve is used (plotting tension as the vertical axis vs. elongation as the horizontal axis) in which the yarn is extended at a constant rate of elongation of 1% per minute. The yarn specimen is held at the maximum elongation desired for 30 seconds and then allowed to retract at the same rate at which it was extended. The same specimen is extended successively several different amounts. The areas under the elongation curve and the retraction curve, respectively, represent work performed on the material and work returned. These areas may be measured with a polar planimeter and the per cent work recovery computed by means of the relation:

$$WR = \frac{\text{Area (Work Returned)}}{\text{Area (Work Performed)}} \times 100$$

Since the quantity of interest is a ratio, the absolute values of the work terms are not necessary.

Initial tensile modulus, which is also a criterion of resilience, is defined as the slope of the first reasonably straight portion of a stress-strain curve of the yarn obtained by plotting tension as the vertical axis vs. elongation as the horizontal axis as the yarn is being elongated at the rate of 10% per minute. In almost every instance this is also the steepest slope to be found on the curve. The values as used herein are in units of grams per denier (g. p. d.) per 100% elongation.

The following examples are further illustrative of the preparation and application of the products of this invention. Parts and percentages are by weight unless otherwise indicated.

*Example I*

To 10 parts of the dimethyl ester of bis(p-carboxyphenyl)methylphosphine oxide is added 11.1 parts of ethylene glycol and 0.1% of zinc borate (based on weight of dimethyl ester). The ester exchange with glycol to form the bis-glycol ester and at the same time driving off methanol is accomplished by heating for 19 hours at 197° C. and atmospheric pressure followed by heating for 3 hours at 259° C. and atmospheric pressure. Polymerization is then accomplished by heating for 20 hours at 259°

C. at a pressure of 0.4 millimeter of mercury under an atmosphere of nitrogen. This polyester has an intrinsic viscosity in meta-cresol of 0.46 and can be easily melt spun into fibers suitable for textile purposes.

The polymer prepared in accordance with this example has the following recurring structural unit:

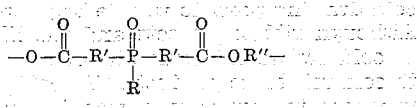

wherein R' is phenylene, R is methyl and R'' is —CH₂CH₂—.

Example II 2.4 parts of the dimethyl ester of bis(p-carboxyphenyl)methylphosphine oxide is placed in a reaction vessel together with 4.44 parts of ethylene glycol, 0.1% of zinc borate and 0.1% of pentaerythritol (both based on the diester). The bis-glycol ester is formed with the removal of methanol by heating for 16 hours at 197° C. and atmospheric pressure followed by heating for 1 hour at 259° C. and atmospheric pressure. Polymerization is then accomplished by heating for 7 hours at 259° C. at a pressure of 0.5–1.0 millimeters of mercury. The polyester has an intrinsic viscosity of 0.40 in meta-cresol. The decrease in polymerization time is caused by the inclusion of pentaerythritol in the reaction mixture.

Example III

Again, 2.1 parts of the dimethyl ester of bis(p-carboxyphenyl)methylphosphine oxide is taken together with 2.1 parts of dimethyl terephthalate and 5.55 parts of ethylene glycol. To this is added 0.1% of zinc borate (based on total weight of esters). The ester exchange is accomplished by heating for 18 hours at 197° C. and atmospheric pressure followed by 3 hours of heating at 259° C. and atmospheric pressure. Polymerization is accomplished by heating at 259° C. for 22 hours under an atmosphere of nitrogen as described previously and a pressure of 0.5 millimeter of mercury. This copolymer has an intrinsic viscosity of 0.48 in meta-cresol and forms tough, clear, cold-drawable fibers that will not support combustion.

Example IV

To 10.0 parts of diethylene glycol is added 2.3 parts of the dimethyl ester of bis(p-carboxyphenyl)methylphosphine oxide and 0.1% of zinc borate. Again, the glycol ester is formed with the removal of methanol by heating for 20 hours at 197° C. and atmospheric pressure followed by 4 hours of heating at 259° C. and atmospheric pressure. Polymerization is accomplished by heating for 20 hours at 285° C. and 0.2 millimeter of mercury pressure. This polyester has an intrinsic viscosity of 0.35 in meta-cresol and is capable of being formed into tough, clear fibers by the conventional melt spinning process.

Example V

The bis-glycol ester of bis(p-carboxyphenyl)-ethylphosphine oxide is formed by heating 1.2 parts of the dimethyl ester together with 5.55 parts of ethylene glycol and 0.1% of zinc borate for 15 hours at 197° C. and atmospheric pressure followed by heating at 259° C. for 6 hours. Polymerization is then accomplished by heating for 17.5 hours at 259° C. at a pressure of 0.3 millimeter of mercury. The polyester has an intrinsic viscosity in meta-cresol of 0.38 and can be melt spun into tough, cold drawable fibers.

Example VI

Another example of copolymerization is shown when 5.1 parts of the dimethyl ester of bis(p-carboxyphenyl) ethylphosphine oxide is mixed with 4.9 parts of dimethyl terephthalate and 16.7 parts of ethylene glycol plus 0.1% of zinc borate. The glycol ester is formed by heating for 16 hours at atmospheric pressure and 197° C. followed by heating for 7½ hours at 259° C. and atmospheric pressure. The reactants are then copolymerized by heating for 11.8 hours at 259° C. under a pressure of 0.3 millimeter of mercury. This copolyester has an intrinsic viscosity of 0.62.

Fiber properties after melt-spinning, and drawing to 3 times their length at 78° C.

Tensile strength _____ 1.03 g. p. d.
Elongation _____ 12%
Initial tensile modulus _____ 30 g. p. d.
Work recovery:
    At 2% elongation_____ 97%
    At 5% elongation_____ 90%

Example VII 5.5 parts of the dimethyl ester of bis(p-carboxyphenyl)phenylphosphine oxide is mixed with 4.6 parts of dimethyl terephthalate and 22.2 parts of ethylene glycol and 0.1% of zinc borate. The glycol ester is then prepared by heating at 197° C. for 18 hours, followed by 4 hours at 259° C. all at atmospheric pressure. Polymerization is then accomplished by heating at 259° C. for 21 hours under a pressure of 0.3 millimeter of mercury. This polymer has an intrinsic viscosity of 0.35, and can be readily spun by the melt spinning procedure to form tough, clear, cold drawable, self-extinguishing fibers and filaments.

Example VIII 5.08 parts of decamethylene diamine and 10.70 parts of bis(carboxyphenyl)phenylphosphine oxide are dissolved in hot, absolute ethanol (600 parts) and the solution concentrated to 100 parts. The oil, which separates, crystallizes on standing with occasional stirring. Because of the high melting point of the salt (245° C.), the salt (10 parts) is mixed with 3 parts of phenol and heated at 197° C. under vacuum to remove water and phenol and complete the polymerization.

The amber-colored polymer may be spun into fibers. It has a sticking point of 195° C. and an intrinsic viscosity of 0.33 in meta-cresol.

The polymer prepared in accordance with this example has the following recurring structural unit:

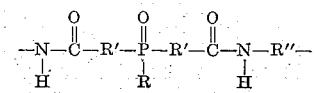

wherein R' is phenylene, R is phenyl and R'' is —(CH₂)₁₀—.

Example IX 2.5 parts of the dimethyl ester of bis(p-carboxyphenyl) ethylphosphine oxide is combined with 22.5 parts of dimethyl terephthalate. To the mixture are added 0.1% of zinc borate (based on the combined weight of the esters) and 26.4 grams of ethylene glycol. In order to effect ester exchange, the mixture is heated for 20 hours at 197° C. and atmospheric pressure. Excess glycol is removed by heating at 259° C. and atmospheric pressure for 3 hours, followed by 0.25 hour at the same temperature under reduced pressure. Polymerization is accomplished by heating 25.5 hours at 259° C. and a pressure of 0.4 millimeter of mercury. The polymer has an intrinsic viscosity of 0.60. The polymer after being melt-spun and drawn 5 times its original length at 75° C. has a tensile strength of 2.1 grams per denier, an elongation of 11%, an initial tensile modulus of 102 and a work recovery of 81% at 1% elongation.

*Example X*

An amine salt is prepared by mixing together a hot solution of 1.82 parts bis(3-aminopropyl) ether in 50 parts of absolute ethanol and a hot solution of 5.14 parts bis(p-carboxyphenyl) methylphosphine oxide in 70 parts of absolute ethanol. Ether is added to hasten crystallization, and the salt is recrystallized from an ethanol-ether mixture. The salt is then placed in a tube which is sealed after being alternately flushed with nitrogen and evacuated several times. The salt is fixed by heating in the sealed tube at 245° C. for 2 hours. It is then heated in an atmosphere of nitrogen for 1 hour at 245° C., and 1 hour at 259° C. The polymerization is completed by heating at 259° C. and a pressure of 0.7 millimeter of mercury for 2 hours. The polymer has an intrinsic viscosity of 0.72 in meta-cresol and can be manually spun into tough, clear fiber.

As many widely different embodiments can be made without departing from the spirit and scope of this invention, it is to be understood that said invention is in no way restricted save as set forth in the appended claims.

I claim:

1. A synthetic linear condensation polymer containing phosphorus atoms as a part of the polymer chain, and having a recurring structural unit selected from the group consisting of

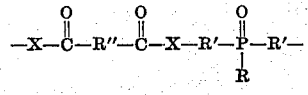

and

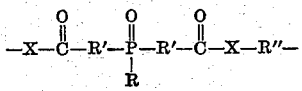

and

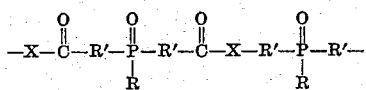

wherein R may be any monovalent hydrocarbon radical, R' is a divalent hydrocarbon radical from the group consisting of divalent aromatic and cycloaliphatic hydrocarbon radicals, R'' may be any divalent hydrocarbon radical, and X is selected from the group consisting of nitrogen and oxygen.

2. A process for producing fiber-forming, synthetic linear condensation polymers containing phosphorus as a part of the polymer chain which comprises heating together difunctional reactants capable of yielding linear condensation polymers, at least one of said reactants containing a single phosphorus atom present as part of the divalent radical

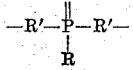

wherein R may be any monovalent hydrocarbon radical and R' is a divalent hydrocarbon radical selected from the group consisting of divalent aromatic and cycloaliphatic hydrocarbon radicals, and continuing the heating under conditions effective to remove volatile products of reaction, until a polymer having an intrinsic viscosity of at least 0.3 is obtained, said polymer having a structure in accordance with claim 1.

3. A synthetic linear condensation polymer containing phosphorus atoms as a part of the polymer chain and having a recurring structural unit selected from the group consisting of

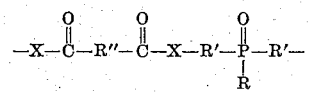

and

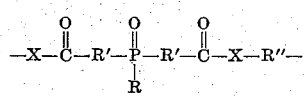

and

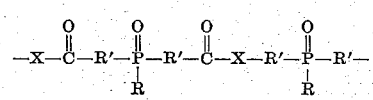

wherein R may be any monovalent hydrocarbon radical, R' is a divalent hydrocarbon radical from the group consisting of divalent aromatic and cycloaliphatic hydrocarbon radicals, R'' may be any divalent hydrocarbon radical, and X is selected from the group consisting of nitrogen and oxygen, said polymer having an intrinsic viscosity of at least 0.3.

4. The synthetic linear condensation polymer of claim 3 in the form of an artificial fiber exhibiting orientation along the fiber axis.

5. The synthetic polymer of claim 1 wherein X is nitrogen.

6. The synthetic polymer of claim 1 wherein X is nitrogen and the said polymer has an intrinsic viscosity of at least 0.4.

7. The synthetic polymer of claim 6 in the form of an artificial fiber exhibiting orientation along the fiber axis.

8. The synthetic polymer of claim 1 in which X is oxygen.

9. The synthetic polymer of claim 1 in which X is oxygen and said polymer has an intrinsic viscosity of at least 0.3.

10. The polymer of claim 9 in the form of an artificial fiber exhibiting orientation along the fiber axis.

11. A process in accordance with claim 2 wherein said polymer obtained is a polyamide.

12. A process in accordance with claim 2 wherein said polymer that is obtained is a polyester.

PAUL W. MORGAN.

References Cited in the file of this patent

UNITED STATES PATENTS

| Number | Name | Date |
|---|---|---|
| 2,435,252 | Toy | Feb. 3, 1948 |